July 1, 1930. J. JOHNSON 1,768,956
MIXING APPARATUS
Filed Jan. 10, 1929   3 Sheets-Sheet 1
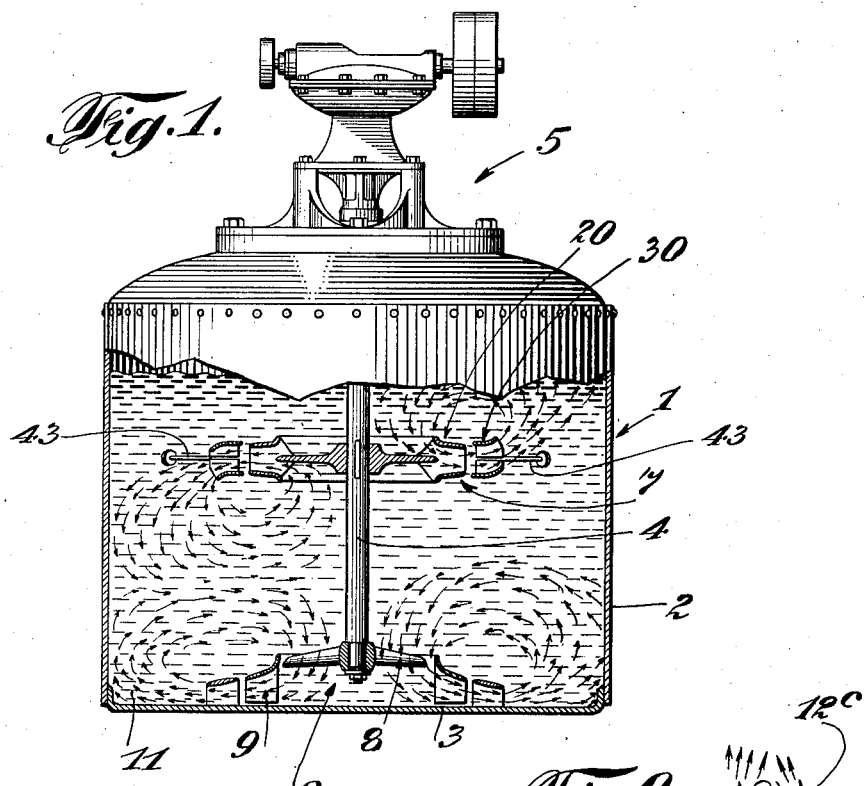
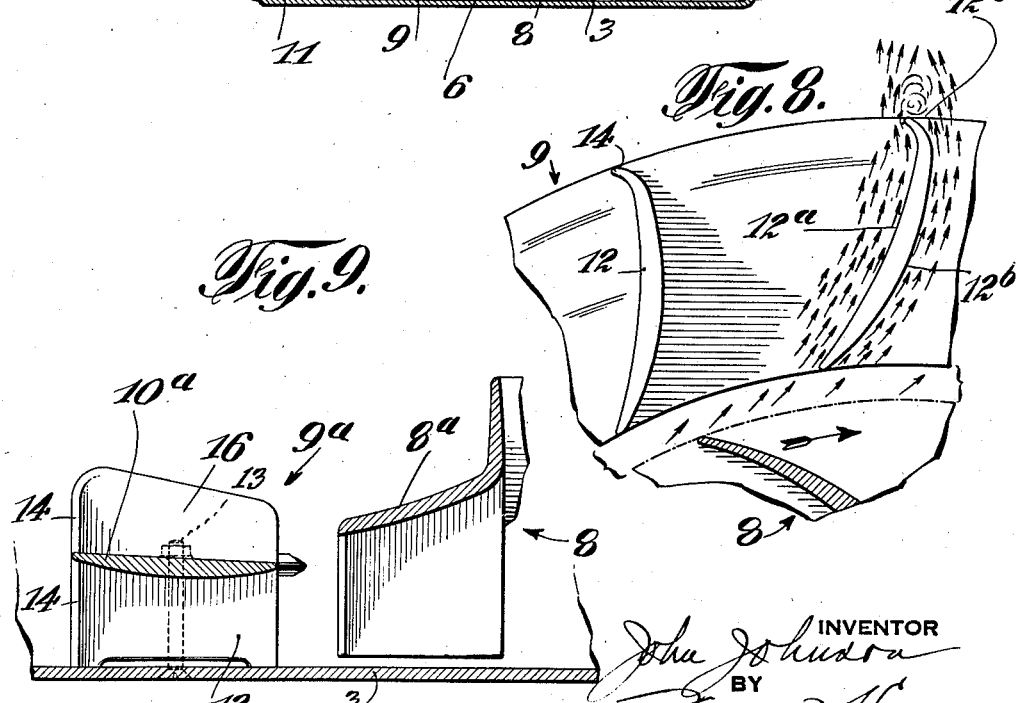

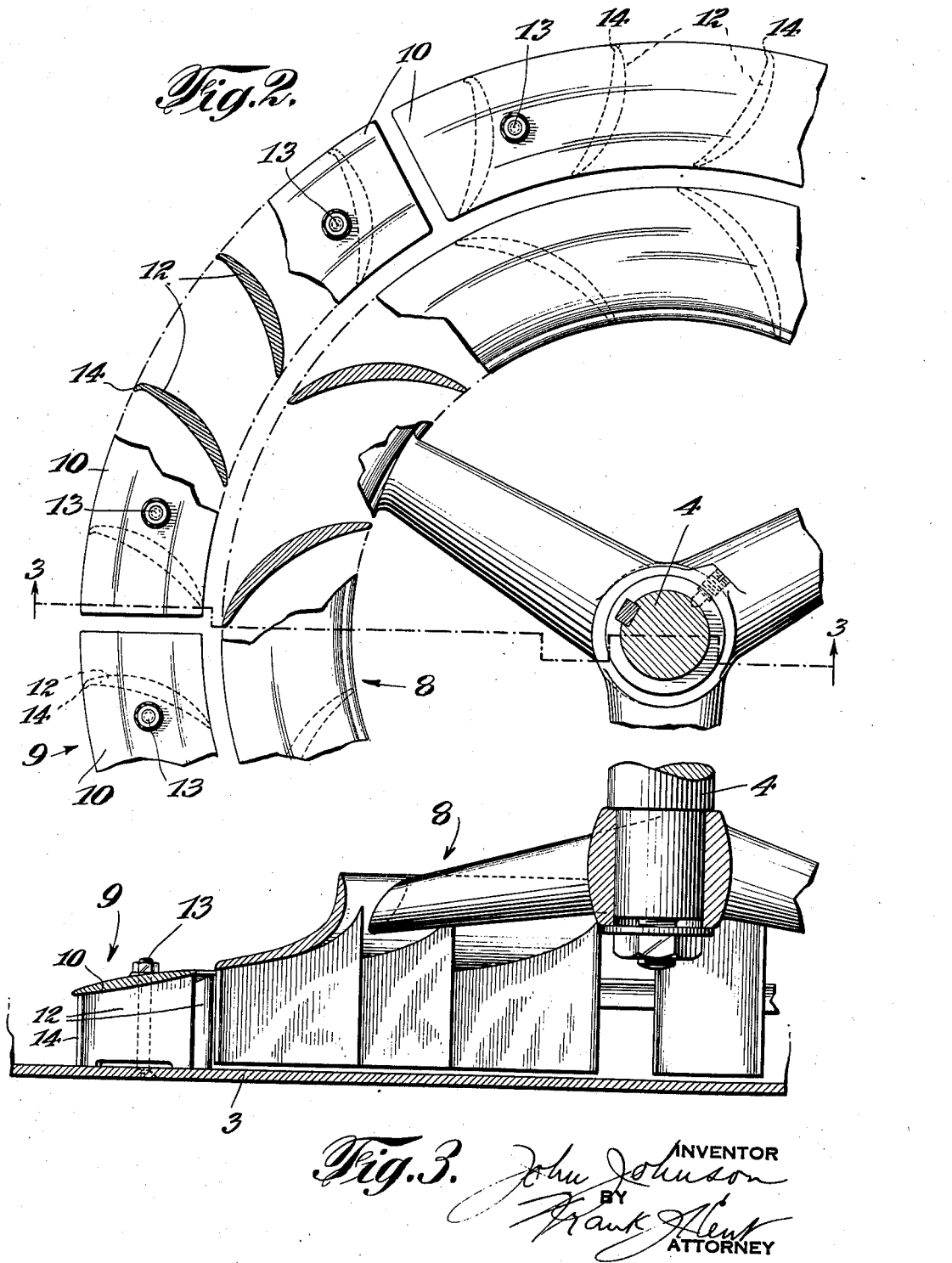

July 1, 1930.  J. JOHNSON  1,768,956
MIXING APPARATUS
Filed Jan. 10, 1929  3 Sheets-Sheet 3
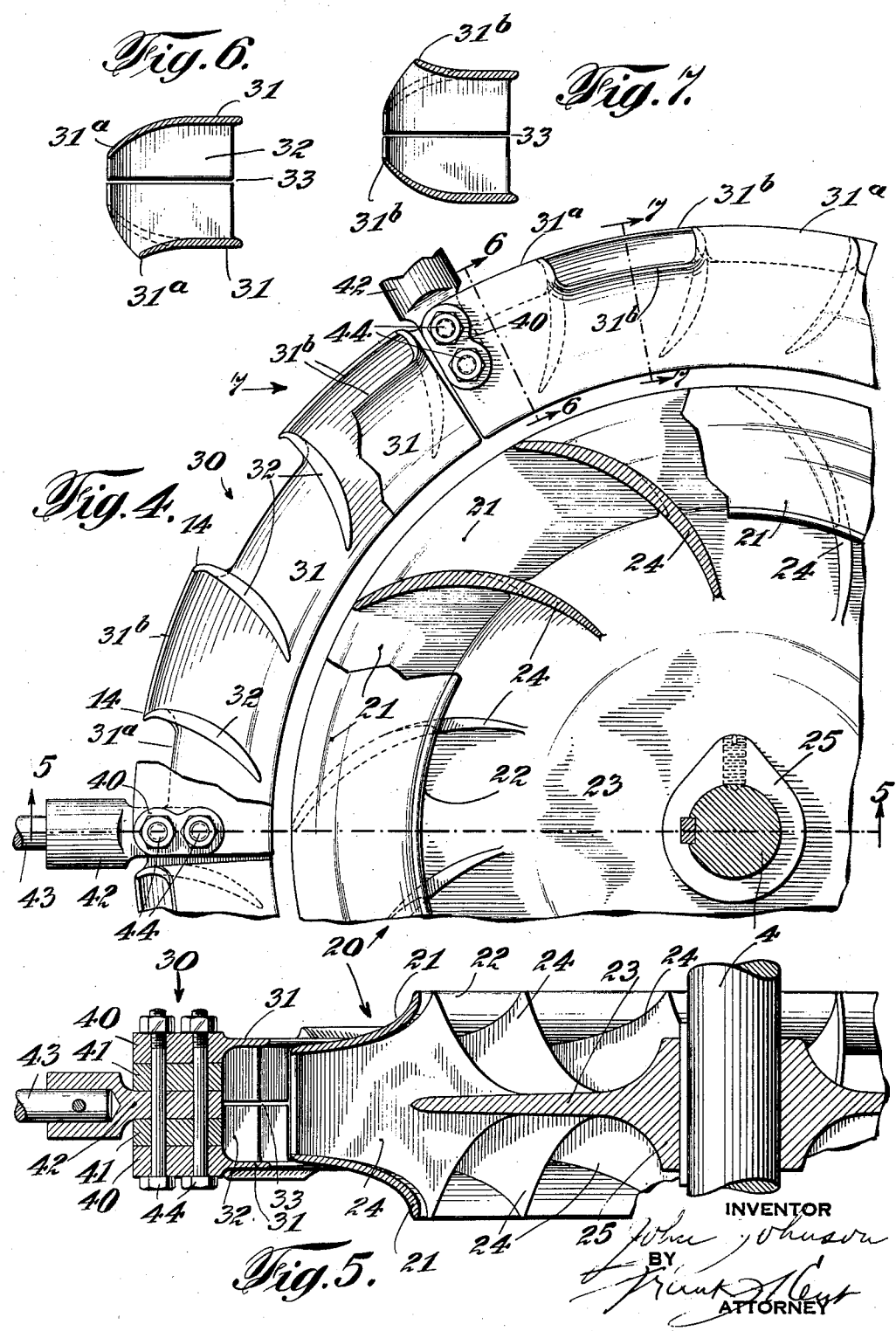

Patented July 1, 1930

1,768,956

UNITED STATES PATENT OFFICE

JOHN JOHNSON, OF MAPLEWOOD, NEW JERSEY, ASSIGNOR TO THE TURBO-MIXER CORPORATION, OF NEW YORK, N. Y., A CORPORATION OF NEW YORK

MIXING APPARATUS

Application filed January 10, 1929. Serial No. 331,493.

My invention relates to apparatus for mixing liquids with gases, solids, or other liquids.

The principal objects are:

To provide new and improved means for controlling and directing liquid flow in vertical, radial planes, with elimination of "dead" areas, in which circulation would otherwise be lacking, or of undesired character; and to provide various other new and improved features in stationary liquid flow controlling structures (or deflectors), including special blade formations which produce eddy-currents and more effective mixing; and an upper or intermediate deflector (sometimes called a "duplex" deflector) comprising upper and lower annular plates between which the deflector blades are located, so that the plates serve to confine and direct liquid flow as well as to support the blades; and to form peripheral portions of these plates in effect as alternately upwardly and downwardly directed nozzles, for corresponding deflection of the discharged liquid.

The characteristics and advantages of the invention are further sufficiently explained in connection with the following detail description of the accompanying drawing, which shows certain exemplifying embodiments. After considering these examples, skilled persons will understand that many variations may be made, and I contemplate the employment of any structures that are properly within the scope of the appended claims.

In the drawing:

Fig. 1 is a view, partly in elevation and partly in axial section, of mixing apparatus embodying the invention in one form.

Fig. 2 is an enlarged fragmentary detail, partly in plan and partly in horizontal section, of the lower, or "simplex" mixing unit of Fig. 1.

Fig. 3 is a section at 3—3, Fig. 2.

Fig. 4 is a detail, or plan and section, of the upper (or duplex) mixing unit.

Fig. 5 is a section at 5—5, Fig. 4.

Fig. 6 is a section at 6—6, Fig. 4.

Fig. 7 is a section at 7—7, Fig. 4.

Fig. 8 explains the eddy-flow produced by the specially formed deflector blades.

Fig. 9 is a fragmentary, vertical section of a modified lower, or "simplex," deflector structure.

In Fig. 1, 1 is any suitable tank, usually having a cylindrical side wall 2, and here shown as having a flat bottom 3, since the lower or "simplex" mixers (located at the tank bottom) as here shown are in some respects especially adapted to cooperate with a flat tank bottom, although in other respects they are adapted for concave or part spherical bottoms (as shown in a companion application executed on even date herewith).

A shaft 4 is arranged centrally in the tank, and at its upper end is supported in bearings in an upper structure 5, which is also provided with driving means, these details not forming parts of the present invention.

Either a lower, or "simplex," mixing unit 6, or an upper, intermediate or "duplex" mixing unit 7, or both, may be located in the tank, substantially as shown, the relative position or "elevation" of the upper unit being largely variable.

The lower unit includes a rotor, or impeller 8, which may be substantially similar in structure and function to those shown in certain of my prior patents, and is therefore not described in detail. This is fixed on shaft 4. Surrounding the rotor, is a stator, or deflector structure 9. This includes an annular top plate 10, which may be continuous, or formed in segments, as best shown in Fig. 2. The plate, or plate segments, are preferably of approximate elongated ovate cross section, that is, of approximate "stream line" section, and are inclined somewhat downward and outward, approximately as shown in Fig. 3, so that the annular passage or nozzle formed between plate 10 and the tank bottom has approximately uniform area from the entrance (inner) to the discharge (outer) side. This plate inclination also serves to confine the radial flow to planes close to the tank bottom, so that in a relatively large tank (Fig. 1, and as shown by arrows therein) the radial flow is forcibly directed to the lower tank "corners" 11, preventing undesired sluggish or "dead" circulation, or reverse eddies, in these corners.

Spaced, vertical deflector blades 12 are secured to, or as shown, cast integral with plate segments 10. The lower ends of the blades may rest on the tank bottom, and thus the plate on plate segments are supported in proper spaced relation to the bottom. The deflector structure is secured in any suitable way, as by bolts 13.

The blades 12 may be of curvature and arrangement similar to that shown in my prior patents above referred to; that is, they may be of substantially stream line section, and of such curvature and angular arrangement as to smoothly receive, at their inner (entrance) edges, liquid discharged centrifugally by the impeller in tangential lines, and progressively alter this flow direction until the liquid is discharged at the outer edges in substantially radial lines (or vertical, axial planes). Desirably, however, as an important improved feature of the present invention, some or all of the deflector blades have their outer (discharge) portions formed as relatively narrow edges (or margins) 14 (see also Fig. 8) which are more abruptly curved in the same direction as that of the general blade curvature. The circulated medium which flows smoothly over the uniformly curved front and rear main blade surfaces, as shown by arrows in Fig. 8, gradually or smoothly changing its direction from approximately tangential, to radial flow, finally encounters the blade portions 14 which are sometimes referred to as "incurved" or "forwardly curved" portions or margins, having reference to the general direction of current flow as discharged by the impeller. Thus, the liquid flowing over the leading blade face $12^a$, abruptly strikes the incurved margin 14, while that flowing near the rearward face $12^b$ tends to produce a low pressure area $12^c$ at the rear of the blade margin; and there is thus produced at the discharge edge of each blade a vigorous whirl or vortex, resulting in efficient and expedited mixing action, and without interfering with the generally radial discharge toward the tank wall.

Fig. 9 shows a modified lower deflector, $9^a$ in which deflector blades, or blade portions 16 are located above the annular plate $10^a$, analogous to plate 10 of the previous example. These blades 16 may be aligned vertically with the lower blades 12, or in interspaced relation thereto. Substantially, the plate (or plate segments) $10^a$ is in an intermediate vertical position, with reference to the blades. Either the lower or upper blades, or both, may have the incurved rear margins 14, as above explained. Plate $10^a$ is usually located at a level below that of plate $8^a$ of rotor 8, so that some of the material centrifugally discharged from the rotor will pass below plate $10^a$, and will flow close to the tank bottom, and toward its side wall, as in the previous example, and a smaller part of the material will flow above plate $10^a$, without vertical restriction, and will therefore tend to move radially and angularly upward, toward the side wall of the tank. In this arrangement, the flow of liquid over the upper surface of plate $10^a$, prevents settling of solids thereon, as might occur in such forms as that of Figs. 1 and 3.

The upper (or duplex) mixing unit 7 (Figs. 1 and 4) includes a duplex impeller or rotor 20 of a type disclosed in various of my prior patents and applications; it has annular upper and lower plates 21 each formed with an entrance throat or flange 22, a central plate or septum 23, and curved impeller blades, which connect plates 2 together and to the septum, which has a hub 25 keyed on shaft 4. Plates 21 thus form, practically, a rotary, annular, nozzle, into which liquid flows axially through the central opening, at both sides of septum 23, and is discharged practically in annular sheet, in tangential directions, by the action of blades 24.

Surrounding the impeller, and in vertically centered relation to it, is the duplex deflector structure 30, which may be annularly continuous, or formed in segments, as shown. Each segment includes arcuate upper and lower plates 31, with deflector blades between them; in some cases each of the blades may be continuous and cast integral with both upper and lower plates, and will then serve to connect the plates together; preferably, however, as here shown, each plate has on its surface confronting the other plate, a deflector blade segment 32, the ends of these upper and lower segments approximately or closely meeting at the central plane 33 of the deflector. Each upper and lower blade segment therefore constitute a complete vertical deflector blade, which may be curved and arranged as explained in connection with the blades 12 of the lower deflector, and may also have "incurved" outer margins 14, as and for the purpose previously explained.

Blades 32 serve to convert the tangentive flow of material centrifugally discharged by the impeller, to a flow in radial (axial) planes. In order to, at the same time, produce desired upward and downward circulation of material discharged from the deflector, I so form the outer plate margins and outer ends of the blades, as to provide substantially, an annular series of nozzles, directed alternately angularly upward and downward, to produce the desired upward and downward flow or circulation approximately as indicated by arrows, with reference to the upper mixer, in Fig. 1. Thus, as best shown in Figs. 4, 6 and 7, alternate corresponding segments of the outer margins of upper and lower plates 31 are curved downward, as at 31ª, Figs. 4 and 6; and alternate, interspaced corresponding segments are curved upward, as at 31ᵇ, Figs. 4 and 7, thus forming discharge orifices or nozzles directed alternately upward and downward, to produce the liquid circulation above explained; conveniently as shown, each of these nozzles may extend circumferentially, a distance equal to that between two adjacent deflector blades, otherwise the nozzle formations may be longer, to embrace two or more blade spaces.

In the arrangement shown, the upper and lower plate sections 31 are secured together in proper relative positions, and to form the complete annular deflector structure, and the latter is at the same time properly supported in the tank, as follows:

The ends of the plate sections are formed with lugs 40 and 41, overlapped, and also overlapping lugs 42, formed on or connected to struts 43, the outer ends of which are secured to the tank wall. Bolts 44 pass through registering holes in the lugs, securing all the parts together.

I claim:

1. In mixing apparatus, a deflector structure including blades arranged to intercept and direct material discharged by a rotor, some of the blades having their outer edges deflected into the path of flow to produce eddy currents in the discharged materials.

2. In mixing apparatus, a deflector structure including blades arranged to intercept and direct material discharged by a rotor, some of the blades having their outward margins curved angularly into the path of flow over the anterior surface of the blade, whereby flow is interrupted and mixing eddies are formed behind said curved blade margins.

3. In mixing apparatus, a deflector structure including curved blades angularly arranged to intercept and direct material discharged by a rotor, at least some of the blades having their outward margins deflected into the path of flow to produce eddy currents in the discharged material.

4. In mixing apparatus, a deflector structure including curved blades angularly arranged to intercept and direct material discharged by a rotor, at least some of the blades having their outward margins bent angularly into the path of flow over the anterior surface of the blade, whereby flow is interrupted and mixing eddies are formed behind said bent blade margins.

5. In mixing apparatus, a deflector structure comprising opposite, spaced, annular flow confining plates, and deflector blades between the plates, the blades having their outward margins incurved in the direction of the anterior blade faces, to create eddy currents in the discharged material.

6. In mixing apparatus, a deflector structure comprising opposite, spaced, annular flow confining plates, the plates having on their confronting faces blade segments, in matching arrangement, the ends of the blade segments approximately abutting to form complete blades bridging the space between the plates.

7. In mixing apparatus, a deflector structure comprising opposite, spaced, annular flow confining plates, and deflector blades between the plates, spaced outer marginal portions of the plates being correspondingly curved from the normal planes of the plates, and interspaced marginal portions being oppositely curved, providing in effect, nozzles directed alternately in opposite angular directions to direct the discharge flow in opposite axial directions.

8. In mixing apparatus, a deflector structure comprising opposite, spaced, annular flow confining plates, and deflector blades between the plates, outer margins of the plates between alternate pairs of blades being curved in one axial direction, and between the intermediate alternate pairs being curved in an opposte direction, forming nozzles directing the discharge flow in opposite directions, away from the normal cross axial plane.

9. In mixing apparatus, a deflector structure comprising opposite, spaced, annular flow confining and supporting plates, and deflector blades between the plates and substantially perpendicular thereto, the blades having their outward margins incurved in the direction of the anterior blade faces, to create eddy currents in the discharged material.

10. In mixing apparatus, a deflector structure comprising opposite, spaced, annular flow confining and supporting plates, the plates having on their confronting faces blade segments, in matching arrangement, the ends of the blade segments approximately abutting to form complete blades bridging the space between the plates.

11. In mixing apparatus, a deflector structure comprising opposite, spaced, annular flow confining and supporting plates, and deflector blades between the plates and substantially perpendicular thereto, corresponding spaced outer marginal portions of the plates being curved from the normal planes of the plates, and interspaced marginal portions being oppositely curved, providing in effect, nozzles directed alternately in opposite angular directions.

12. In mixing apparatus, a deflector structure comprising opposite, spaced, annular flow confining and supporting plates, and deflector blades between the plates and substantially perpendicular thereto, outer margins of the plates between alternate pairs of blades being curved in one axial direction, and between the intermediate alternate pairs being curved in an opposite direction, forming nozzles directing the discharge flow in opposite directions, away from the normal cross axial plane.

13. In mixing apparatus, a deflector structure comprising an annular plate, and deflector blades thereon extending substantially perpendicularly below the plate and having their lower ends adapted to rest on a tank bottom, the plate forming in conjunction with the tank bottom an annular nozzle directing radial flow radially outward.

14. In mixing apparatus, a deflector structure comprising an annular plate, and curved deflector blades thereon extending substantially perpendicularly above and below the plate.

15. In mixing apparatus, a deflector structure comprising an annular plate, and deflector blades thereon extending substantially perpendicularly below the plate and having their lower ends adapted to rest on a tank bottom, the plate forming in conjunction with the tank bottom an annular nozzle directing material flow radially outward, the blades being curved and angularly arranged.

16. In mixing apparatus, a deflector structure comprising an annular plate, and deflector blades thereon extending substantially perpendicularly below the plate and having their lower ends adapted to rest on a tank bottom, the plate forming in conjunction with the tank bottom an annular nozzle directing material flow radially outward, the blades being curved and angularly arranged, and their outer margins being incurved toward the anterior sides of the blades.

17. In mixing apparatus, a deflector structure comprising an annular plate and deflector blades thereon extending substantially perpendicularly to the plate and having their lower ends adapted to rest on a flat tank bottom, the plate being inclined downward and outward, and forming in conjunction with the tank bottom an annular nozzle directing material flow along the bottom and into the tank corners, with elmination of dead areas.

18. In mixing apparatus, a deflector structure comprising an annular plate and deflector blades thereon extending substantially perpendicularly to and above and below the plate and having their lower ends adapted to rest on a flat tank bottom, the plate being inclined downward and outward, and forming in conjunction with the tank bottom an annular nozzle directing material flow along the bottom and into the tank corners, with elimination of dead areas.

19. In mixing apparatus, a deflector designed to cooperate with a rotor and to be located substantially at the bottom of a tank, and comprising vertical blades and an annular plate supported and spaced from the tank bottom by the blades, and inclined to form an annular nozzle directing discharged material parallel with the tank bottom to the tank corners.

In testimony whereof I affix my signature.

JOHN JOHNSON.